Nov. 10, 1970 W. R. HESLOP ET AL 3,539,411
PROCESS FOR PROTECTIVELY COVERING SUBSTRATE ARTICLES
Original Filed Aug. 21, 1964
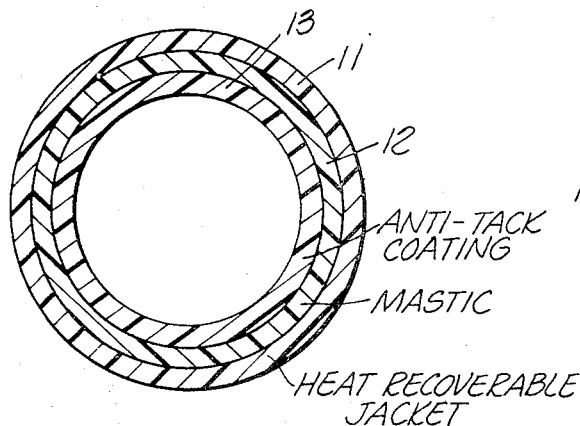
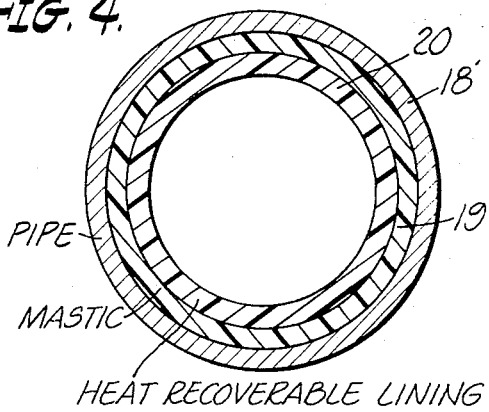
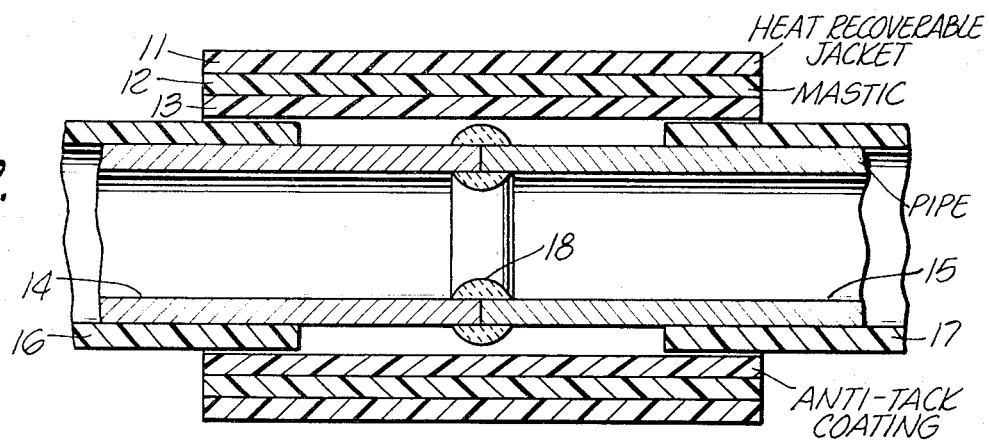
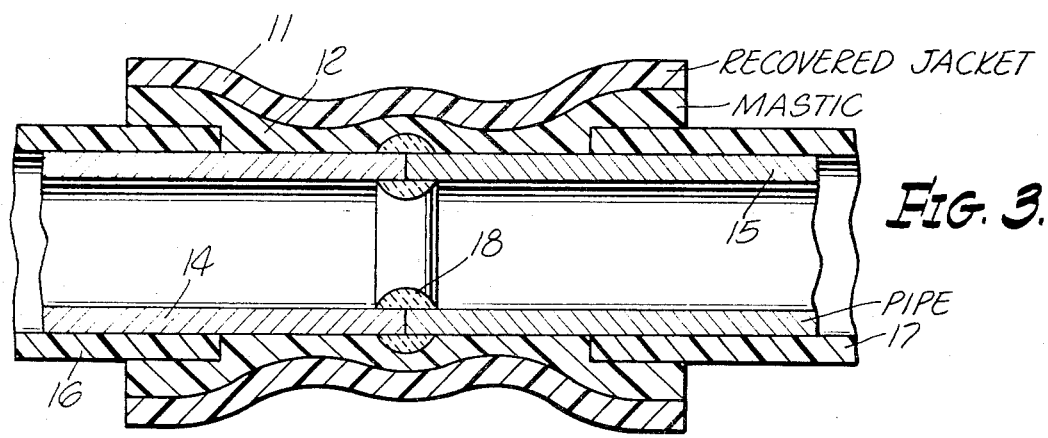
INVENTORS.
WILLIAM ROSSE HESLOP
VINCENT L. LANZA
EDWARD C. STIVERS
BY Lyon + Lyon
ATTORNEYS

United States Patent Office 3,539,411
Patented Nov. 10, 1970

3,539,411
PROCESS FOR PROTECTIVELY COVERING SUBSTRATE ARTICLES
William Rosse Heslop, Vincent L. Lanza, and Edward C. Stivers, Atherton, Calif., assignors to Raychem Corporation, Redwood City, Calif., a corporation of California
Original application Aug. 21, 1964, Ser. No. 391,090, now Patent No. 3,415,287. Divided and this application Dec. 7, 1967, Ser. No. 720,004
Int. Cl. B29c 27/00
U.S. Cl. 156—86   7 Claims

ABSTRACT OF THE DISCLOSURE

Means for covering pipes or other substrates comprising a heat recoverable member having an adhesive material which is tacky at normal temperature on one side thereof and an anti-tack coating which is soluble in the adhesive at the recovery temperature of the heat recoverable member and covering said tacky adhesive so that a non-tacky surface is exposed. This covering means may be used to cover pipes or other substrates by positioning the covering means adjacent to the substrate and applying heat such that the heat recoverable member changes dimension and forces the adhesive and dissolved anti-tack coating into contact with the substrate to produce a covered article in which the forces exerted on the adhesive by the heat recoverable member and the substrate will cause the adhesive to fill any holes or abrasions which may be made in the outer surface of the covering.

CROSS-REFERENCE TO RELATED APPLICATION

This application is a division of application Ser. No. 391,090, filed Aug. 21, 1964, now United States Patent No. 3,415,287.

BACKGROUND OF THE INVENTION

The present invention relates to a means and process for protecting pipe and similar articles against corrosion and other damage by applying a protective coating thereto. The present invention relates to a means and process which are particularly suitable for protecting pipe joints and the like, but which have a wide variety of other applications.

It has long been known to apply protective coatings over metal pipe to impart corrosion resistance thereto. Such coatings are particularly useful when applied to steel pipe and tubing which is to be buried, e.g., those used for gas transmission lines. One of the most suitable methods of applying such coatings to metal pipe has been to extrude a plastic coating over the pipe. Generally, this coating is a hard, abrasion resistant, electrically insulative plastic, e.g., vinyl polymers such as polyvinyl chloride, polyethylene, cellulose esters such as cellulose acetate or cellulose acetate butyrate, copolymers such as copolymers of ethylene and alkyl acrylates, etc. More recently, it has been proposed to provide protective coatings to pipes by first applying a coating of viscous material to the pipe and then extruding an outer protective coating over the viscous material, e.g., in the manner disclosed in Pat. No. 3,012,585. Such coatings have several advantages over simple extruded coatings including better adhesion of the outer coating to the pipe and, in some cases, a certain degree of "self-sealing" capability. This self-sealing capability results from a certain amount of pressure being exerted on the viscous inner coating by the outer coating due to post-extrusion shrinkage and/or pressure exerted by the soil in which the pipe is buried. Thus, provided the inner coating is sufficiently flowable and sufficient pressure is exerted by the outer coating, the inner coating may be forced into punctures made in the outer coating by this pressure.

In general, the prior art coatings have been found satisfactory for lengths of pipe as such when it has been possible to extrude the covering over the pipe. However, in practice, it is invariably necessary to use several lengths of pipe in a given pipe line and it is necessary to form joints between these lengths of pipe. These joints are, of course, fabricated in the field while the pipe line is being laid. Thus, there is no practical method available for extruding the protective coating for the pipe joint over the joint. Generally, the joints have been covered with tape-wound coatings. However, such tape wound joint coverings have been found to be substantially inferior to the extruded coatings provided on the body of the pipe. Thus, the great majority of failures of pipe lines have occurred at the joints where the tape-wound or other coatings have permitted corrosion or other damage which has resulted in failure. It has long been apparent to those skilled in the art that there is a pressing need for an effective means and process for protecting pipe joints, but no satisfactory solution to this problem has previously been proposed. The same problems are associated with attempts to install or repair protective coverings on lengths of pipe in the field.

Thus, it is a primary object of the present invention to provide a means and process for providing highly effective protective coverings to metallic pipes, pipe joints and the like.

It is another object of the present invention to provide a means and a process for applying protective coatings to pipes and pipe joints which may simply and easily be applied to the joint while the pipe line is being laid.

It is a further object of the present invention to provide a means for applying protective coating to pipes and pipe joints comprising a heat dimensionally unstable article, a flowable viscous material and an antitack coating over the viscous material, the antitack coating going into solution in the viscous material under the temperature conditions at which the dimensionally heat unstable article can be caused to change dimension and the use thereof.

Still another object of the present invention is to provide a means for applying a protective coating to pipes and pipe joints comprising an elastic memory material, a mastic-type coating on at least one surface of the elastic memory material and a wax antitack coating covering the mastic-type material, the wax going into solution in the mastic-type material under the temperature conditions at which the elastic memory material undergoes recovery and the use thereof.

Other objects and advantages of the present invention, it is believed, will be apparent from the following detailed description of specific embodiments thereof when read in connection with the drawings.

Briefly, the present invention comprises a means suitable for functioning as a protective coating for pipes and pipe joints comprising a dimensionally heat unstable member, a mastic-type viscous material which is flowable at ordinary temperatures under the pressure exerted by the dimensionally heat unstable member on at least one surface of the dimensionally heat unstable member, and an antitack coating covering the mastic-type material which antitack coating goes into solution in the mastic-type material under the temperature conditions at which the dimensionally heat unstable member undergoes recovery and remains in solution at service temperature. This means may be applied to a pipe joint which it is desired to protect by sliding the means along the pipe until it is positioned adjacent to the exposed joint. In most cases, the body of the pipe will, of course, already have been provided with a protective coating, usually an extruded coating. Heat is then applied to the means of the present invention to cause the dimensionally heat unstable member to change dimension in such a manner as to urge the mastic-type material toward the pipe joint. Preferably, the pipe is preheated immediately before the means of the present invention is applied, particularly when external coverings are applied to large diameter pipes, e.g., on the order of three feet. As previously noted, the antitack coating goes into solution in the mastic-type material under these temperature conditions and will dissolve into the mastic-type material without substantially affecting the properties thereof and remains in solution at service temperature.

The means of the present invention will often be tubular in shape with the mastic-type coating being provided on the inner surface thereof and the antitack coating covering the mastic-type coating. However, it may also be a tape capable of being wound around the article to be protected or may have any other suitable shape. When used to protect pipe joints, the means of the present invention is also preferably provided with a longitudinal dimension sufficient to cause it to overlap with the protective covering already present on the pipe in such a manner as to effectively bond the means of the present invention to a portion of the existing protective coating as well as the exposed metal portion of the pipe and joint. Thus, when the dimensionally heat unstable member is caused to recover the mastic-type material will be forced into contact with the exposed pipe and a portion of the pre-existing protective coating. When the means of the present invention is allowed to cool after recovery, a highly effective protective covering for the pipe joint results. In addition, the dimensionally heat unstable member of the means of the present invention continues to apply pressure to the mastic-type material after the means of the present invention has been installed due to residual internal stresses generated by phase change to the crystalline state caused by the recovery process and to the difference in coefficient of thermal expansion between the dimensionally heat unstable member and the pipe. This continued application of pressure imparts a highly effective self-sealing capability to the means of the present invention after it has been installed since it causes the mastic-type material to flow into any puncture or hole which may be made in the protective covering. As previously noted, the mastic-type material is selected so as to be capable of flowing at service temperatures such as room temperature and substantially lower temperature as low as 0° C. and lower under the pressure exerted by the dimensionally heat unstable member after installation of the means of the present invention on a pipe or pipe joint. In this regard, it has been found desirable to use mastic-type materials which are thixotropic.

Referring now to the drawings:

FIG. 1 is a transverse cross section of the means of the present invention.

FIG. 2 illustrates the manner in which the means of the present invention may be positioned over a pipe joint preparatory to providing a protective covering thereon.

FIG. 3 illustrates a pipe joint after a protective covering has been applied according to the present invention.

FIG. 4 illustrates a pipe which has been provided with an internal protective covering according to the present invention.

As shown in FIG. 1, the means of the present invention comprises a dimensionally heat unstable member 11, the inner surface of which is provided with mastic-type material 12. Antitack coating 13 is provided over mastic-type material 12. Antitack coating 13 is an essential part of the present invention because in the absence of this coating it has been found that the extremely strong adhesive properties of mastic-type coating 12 result in making it almost imposible to slide a tubular member having a mastic coating on its inner surface along a pipe of any substantial length without the mastic sticking to the outer surface of the pipe and causing the mastic to be removed from the inner surface of the tubular member and/or causing the tubular member to adhere to the outer surface of the pipe at a location where such adhesion is not desired.

The primary difficulty presented by any attempt to provide the mastic-type material 12 with an antitack coating is that such a coating, by its very nature, would be expected to interfere with the adhesive properties of the mastic-type material at the time when it is desired to cause the mastic-type material to adhere to a pipe joint or the like. Stated differently, the antitack coating must effectively prevent the mastic material from adhering to other objects while the protection means is in storage and while the protection means is being positioned over the joint by sliding it along the length of the pipe and at the same time must not interfere with the adhesion of the mastic to the pipe joint when the protective covering is actually applied.

One of the primary contributions of the present invention is the use of suitable waxes as an antitack coating. It has been found that some waxes will provide effective antitack properties at ordinary temperatures and also go into solution in mastic under the temperature conditions at which dimensionally heat unstable materials undergo recovery. Thus, there is a unique and unexpected three-way coaction between the dimensionally heat unstable member, mastic-type material and wax antitack coating of the means of the present invention.

In the practice of the present invention, it is preferred to use a material having the property of elastic memory such as that disclosed in United States Pat. No. 3,086,242 as the dimensionally heat unstable member 11. As is well known to those skilled in the art, materials having the property of elastic memory are dimensionally heat unstable and may be caused to change shape and/or dimension simply by the application of heat. Elastic memory may be imparted to polymeric materials by first extruding or otherwise molding the polymer into a desired shape. The polymer is then cross-linked or given the properties of a cross-linked material by exposure to high energy radiation, e.g., a high energy electron beam, initiation of cross-linking by exposure to ultra-violet irradiation, or by chemical means, e.g., peroxides when polyolefins are used. The cross-linked polymeric material is then heated and deformed and then locked in the deformed condition by quenching or other suitable cooling or, in the alternative, the same process can be accomplished at room temperature by using greater force to deform the polymer. The deformed material will retain its shape almost indefinitely until exposed to a temperature sufficient to cause recovery, e.g., approximately 250° F. in the case of polyethylene. Among the polymers which may be so processed are polyolefins such as polyethylene and polypropylene, polyamides, polyurethanes, polyvinylchloride, polyvinylidene-fluoride, and elastomeric materials such as elastomeric polyurethanes and those disclosed in copending application Ser. No. 65,953, filed Oct. 31, 1960, the disclosure of which is incorporated by reference herein. The property of elastic memory may also be imparted to materials having the properties of cross-linked polymers such as polytetrafluoroethylene and very high molecular weight polyolefins or vinyl polymers such as polyvinyl chloride. While elastic memory materials such as those described above the preferred for use in the present invention, it is to be understood that other dimensionally heat unsable materials such as those disclosed in United States Pat. No. 2,027,962 may be used.

The present invention is further illustrated by the following examples.

EXAMPLE I

A protection means of the present invention was prepared by providing the inner surface of an irradiated polyethylene tube having an inside diameter of 1.55 inches with a coating of mastic (6718–31F manufactured by Farboil Company) having a thickness of 20 mils. The irradiated polyethylene possessed the property of elastic memory such that it would decrease in diameter upon the application of sufficient heat and had a recovery temperature of 275° F. A coating of approximately 0.005 inch of wax was applied over the mastic. The resultant wax film was virtually invisible, tack free and imparted an even gloss to the mastic. The wax used was "Trewax-non-slip" liquid floor wax and contained carnauba wax as 70% of the total solids.

As illustrated in FIGS. 2 and 3, this protective means comprising polyethylene 11, mastic 12 and wax 13 was positioned over a joint between pipes 14 and 15. As shown in FIG. 2, there is a clearance between the protective means and the pipe to permit easy postioning of the protective means. Pipes 14 and 15 were standard commercial pipes which had been provided with protective coatings 16 and 17, respectively, by extruding polyethylene over an initial mastic coating (not shown) on the pipe. Such protected pipe is available commercially as X-Tru-Coat pipe (manufactured by Republic Steel Corporation) and is believed to be the most economically satisfactory protected pipe presently available. Polyethylene tube 11 was one foot long while the exposed metal pipe surface had an axial length of four inches.

The pipe was preheated to approximately 220° F. for 45 seconds before the protective sleeve was positioned in the manner illustrated in FIG. 2. The assembly illustrated in FIG. 2 was then exposed to a temperature of 275° F. thereby causing polyethylene tube 11 to recover around pipes 14 and 15, and around weld 18. Under these temperature conditions, wax 13 was completely dissolved by mastic 12. As illustrated in FIG. 3, the recovered polyethylene tube tightly gripped existing protective coverings 16 and 17 and the exposed portions of pipes 14 and 15 with mastic 12 filling all spaces between polyethylene tube 11 and the remaining elements of the assembly.

The protected pipe joint prepared as described immediately above was then subjected to a comparison test with a length of X-Tru-Coat pipe without any splice and a length of such pipe in which the joint was protected with a mastic coated polyethylene tape wound around the joint, such tape being available commercially as X-Tru-Tape. A 0.04 inch diameter hole and a 1/32 inch wide slit two inches long were made in each specimen so that bare metal was exposed. The pipe ends were then sealed with rubber stoppers and dipped in hot wax to form an electrically insulative coating and the specimens were immersed in tap water.

After 35 days immersion, each specimen was examined. In the protective coating of the present invention, it was found that there was no rust in the hole and the mastic was extruding about 1/4 inch out of the hole while the slit was completely filled with mastic with only a small spot of rust at the center and at one end of the slit. In the X-Tru-Coat pipe without any splice therein, it was found that there was a substantial amount of rust in the hole with no mastic extruding therefrom and that there was rust in three quarters of the length of the slit with mastic being present only at one end of the slit. In the X-Tru-Tape protected joint, it was found that the tape had partially delaminated on one side of the slit to form a gap about 0.3 inches wide. The tape was also beginning to loosen near the top of the splice. In the tape protected splice, it was found that there was rust in the hole and severe rust in the slit.

Thus, this comparison clearly established that the pipe joint protection means of the present invention functioned in a manner far superior to that of tape protection and, in fact, better than the conventional extruded protection on the length of the pipe with no joint therein.

EXAMPLE II

A length of polyethylene tubing which had been irradiated to a dose of 15 megarads and which had been given the property of elastic memory such that it would increase in diameter upon the application of sufficient heat was provided with an outer coating of mastic (Johns-Manville Asbestos Fibrous Roof and Foundation Coating). The polyethylene tubing had an outside diameter of 2.015 inches and the mastic layer was 20–30 mils thick. The mastic coating was provided with an outer coating of approximately 0.0005 inch of wax which imparted a tack-free surface on the mastic. The wax used was "Trewax-non-slip" liquid floor wax. The coated polyethylene tubing was then inserted into a length of aluminum pipe having an inside diameter of 2.082 inches. This assembly was then heated such that the tubing was exposed to a temperature of 575° F. until the tubing expanded and forced the wax coated mastic into contact with the inner surface of the aluminum pipe. Under these temperature conditions, the wax was completely dissolved by the mastic. As illustrated in FIG. 4, the pipe 18 was thus provided with an effective protective lining comprising mastic 19 which had wax dissolved therein and expanded polyethylene tube 20.

EXAMPLE III

The protection means of the present invention is most suitable for protecting pipes and the like having large diameters as well as small diameters. In this example, a steel pipe having an outside diameter of 36 inches was provided with a protective covering. The protection means used in this example comprised an irradiated polyethylene tube having an inside diameter of 38 inches with a coating of mastic (6718–31F, manufactured by Farboil Company). The irradiated polyethylene possessed the property of elastic memory such that it would decrease in diameter upon the application of sufficient heat and had a recovery temperature of 275° F. A coating of approximately 0.0005 inch of wax was applied over the mastic. The resultant wax coated mastic was tack free. The wax used was "Trewax-non-slip" liquid floor wax.

This protection means was six inches wide and was positioned over a section of bare pipe. The pipe was preheated for 45 seconds to a temperature of approximately 220° F. before the protective sleeve was positioned and the assembly was then exposed to a temperature of 275° F. thereby causing the polyethylene tube to recover around the pipe. Under these temperature conditions, the wax was completely dissolved by the mastic. The recovered polyethylene tube tightly gripped the pipe with the mastic filling all of the spaces between the inner surface of the polyethylene tube and the outer surface of the pipe.

A 0.04 inch diameter hole and a 1/32 inch wide slit two inches long were then made in the protective covering. Within 24 hours at room temperature, each of these apertures had been closed by the mastic which flowed into them. Thus, this protection means was clearly shown to possess effective self-sealing capability.

The present invention possesses other advantages in addition to those already discussed herein. One such advantage is the function of the wax coating 13 to inhibit oxidation of mastic 12 during storage. It has been found that exposure of mastic to the atmosphere for substantial periods of time results in oxidation of the mastic which in turn has an adverse effect on the properties of the mastic, particularly the adhesive properties thereof. This deterioration due to oxidation is particularly acute when storage is at moderately elevated temperatures as often occurs in conventional industrial practice. Wax coatings such as that described in the preceding examples which are stable at temperatures up to 160° F. and higher, effectively inhibit this oxidative deterioration.

In the preferred embodiment of the present invention wherein elastic memory materials are used to fabricate dimensionally heat unstable member 11, several additional advantages over and above those possessed by the broad concept of the present invention are obtained. One such advantage is the high degree of penetration resistance of elastic memory materials comprising cross-linked polymers. This penetration resistance is, of course, of substantial importance with regard to many environments in which the present invention may be practiced, particularly those involving protecting pipe or other objects which are to be buried in the ground since such objects are subject to coming into contact with sharp stones or other buried objects which present the danger of damage to the protective covering. Another advantage results from the difference in coefficient of thermal expansion between the elastic memory material and the metallic pipe or other substrate to which the means of the present invention is to be attached. This is particularly important with regard to the self-sealing characteristics of the protective means of the present invention. In addition to the compressive forces resulting from the elastic memory properties of recoverable member 11, the fact that the coefficient of thermal expansion of the elastic memory material will be greater than that of the metal of the pipe or other substrate to which it is applied will result in the contraction of the pipe on cooling to an extent which is less than the contraction of the elastic memory material even if the pipe is heated to the same temperature ast he elastic memory material. Thus, an additional pressure will be exerted by the recoverable member on the mastic material and substrate after the recoverable member has cooled which is greater than that exerted when the recoverable member is still hot after being caused to undergo recovery. The importance of this additional pressure is established by the preceding example wherein it was shown that the self-sealing properties of the protective coverings of the present invention are superior to conventional coverings which have been extruded over a pipe having a coating of mastic thereon.

While the foregoing description has emphasized the use of the present invention to apply protective coatings to pipe joints, it is to be understood that it has a wide range of utility in addition to this specific use. In this regard it is important that the present invention may be used to provide protective coverings on internal surfaces as described in Example II. Thus, the means of the present invention may be used to provide a protective covering over the internal surface of a pipe or pipe joint in those instances where a protective covering is desirable, e.g., where the entire internal surface of a pipe is provided with a protective covering to render it suitable for conveying corrosive liquids which would attack exposed metal surfaces. In such embodiments, the difference in coefficient of thermal expansion between the recoverable member and the pipe tends to cause the pipe and lining to separate but the mastic performs the highly desirable function of maintaining an effective bond between the two.

The mastic preferred for use in the present invention is a mixture of reclaimed rubber and asphaltic-based material made from the distillation of coal or petroleum products. The mastics used should be thermoplastic, and should be thixotropic such that the viscosity thereof decreases with increases in shear. Mastics having viscosities of up to about $10^{13}$ centipoise at 25° C. have been found suitable for use in the present invention, but even more viscous materials could be used if they were sufficiently thixotropic such that they would flow at ordinary temperatures under the pressure exerted by the dimensionally heat unstable member which forms a part of the protection means of the present invention. In general, the viscosity of the mastic at the recovery temperature of the dimensionally heat unstable member is preferably in the range of $10^3$ to $10^6$ centipoise. The softening point of the mastic, as measured by the ring and ball technique, is preferably in the range of 40 to 80° C. The interfacial tension of the mastic should be low and preferably on the order of 5 to 40 ergs per square centimeter. The water absorption of the mastic should be low.

In general, the mastic-type substances which are most satisfactory for the present invention are materials which are quite tacky and sticky at room temperature. This stickiness or tackiness at room temperature is highly desirable since it enhances adhesion of the protection covering to the pipe. However, the sticky or tacky nature of the mastic-type material represents a major problem in the fabrication, shipping and installation of articles of the type of those of the present invention. It often occurs that long periods of time must elapse between the coating of a dimensionally heat unstable member with mastic and the eventual installation of the dimensionally heat unstable member on a pipe, pipe joint or the like. If the mastic were exposed during this period of time, foreign substances of many types would be able to collect on the exposed mastic surface and tend to render it non-adhesive to the pipe, pipe joint or the like upon which it will ultimately be installed. Furthermore, the protective means must often be slid over a substantial length of pipe in order to locate it in the desired position. If the mastic coating is exposed, this sliding is rendered extremely difficult, if not impossible. Thus, the very stickiness which makes the mastic desirable also create competing problems.

A major contribution of the present invention is therefore to place an antitack coating over the mastic-type material. This antitack coating must have several properties. Perhaps the most important of these properties is that of going into solution in the mastic material under the temperature conditions at which the dimensionally heat unstable member undergoes recovery remaining in solution at service temperatures. The antitack coating must be miscible with the mastic material, and yet at or near room temperature its rate of solubility into the mastic must be extremely low so as to assure a long effective life for the antitack coating. In addition, when the antitack material is dissolved into the mastic during recovery, it must not interfere with the adhesive properties of the mastic.

It has been found that certain hard waxes which melt in the range of 50–90° C. are particularly effective as antitack coatings and carnauba wax is preferred. It has also been found that wax-rosin mixtures, particularly beeswax-rosin mixtures are effective. Other waxes which are contemplated for use in the present invention are ouricury, candelilla and palm waxes.

Preferably, the wax is applied to the mastic in the form of an emulsion. Preferably, the wax emulsion will form a clear, transparent film upon drying. The antitack coating must of itself and in combination with the mastic be noncorrosive. The melting point of the antitack material may be chosen at will, the choice depending upon the shelf life requirement of the antitack coating and the time and temperature conditions which will be used to cause the dimensionally heat unstable member to undergo recovery. In general, since the time for recovery of many dimensionally heat unstable members will be quite short, antitack materials of relatively low molecular weight are preferred.

In addition to the antitack material disclosed in the foregoing examples, it has been found that an emulsion comprising 100 parts water, three parts polyvinyl alcohol, 0.5 part sodium lauryl sulphate and 50 parts beeswax-rosin mixture, all parts being by weight, is most suitable for use in the present invention. The proportions of beeswax and rosin may be varied with increasing amounts of beeswax tending to reduce the shelf life at 120° F. of the antitack coating. A beeswax-rosin mixture comprising 60% beeswax and 40% rosin has been found to provide excellent shelf life characteristics and good adhesion characteristics of the mastic after recovery. The adhesion characteristics after recovery improve with increasing amounts of beeswax and a 70–30 mixture has been found to give fair shelf life (slight tackiness after one week) at 120° F. and excellent adhesion after recovery.

When carnauba wax emulsions are used, it has been found that emulsions containing 10–15% solids, which are 80–90% alkyl wax acid esters, are particularly suitable.

In general, the thickness of the antitack coating should be at least about 0.0001 inch and for most purposes, coatings of more than 0.02 inch are not required. However, even thicker wax coatings may be required for particular uses or for particularly large articles or assymmetrical or oddly shaped articles.

The thickness of the mastic coating on the protection means of the present invention may vary within wide limits depending upon the size of the article which it is desired to protect. For example, an inside mastic coating having a thickness of 0.015–0.020 inch has been found preferable for recoverable members having an expanded inside diameter of about 1.5 inches while a thickness of 0.02–0.025 inch has been found preferable for recoverable members having expanded inside diameters of about 2–3 inches. Outside mastic coatings on expandable articles of the same size may be substantially thicker. However, even very thin coatings of mastic have been found to function in a reasonably satisfactory manner. For example, in certain circumstances coatings as thin as 0.003 inch have been effective.

Having fully described the present invention, it is to be understood that it is not to be limited to the specific details set forth, but is of the full scope of the appended claims.

We claim:

1. A process for applying a protective covering to a substrate comprising positioning a covering means adjacent to said substrate, said covering means comprising a dimensionally heat unstable member, said dimensionally heat unstable member being provided with a mastic coating on the surface closest to said substrate, said mastic coating being covered by an antitack coating, said antitack coating comprising a wax which goes into solution in said mastic under the temperature conditions at which said dimensionally heat unstable member undergoes a change in dimension, subjecting said means to sufficient heat to cause said dimensionally heat unstable member to undergo a change in dimension whereby said mastic is urged toward and into contact with said substrate and whereby said antitack coating dissolves in said mastic, and allowing said means to cool.

2. A method for providing a protective covering to a tubular metallic substrate comprising positioning a tubular covering means adjacent to said substrate in such a manner that said means and said substrate are in generally coaxial relation to each other, said covering means comprising a dimensionally heat unstable member comprising a material having the property of elastic memory, said dimensionally heat unstable member having a coefficient of thermal expansion greater than that of said substrate, the surface of said means closest to said substrate being provided with a coating of mastic, an antitack coating covering said mastic, said antitack coating comprising a wax which goes into solution in said mastic under the temperature conditions at which said dimensionally heat unstable member undergoes a change in dimension, subjecting said dimensionally heat unstable member to sufficient heat to cause it to undergo a change in dimension whereby said mastic is urged toward and into contact with said substrate and whereby said antitack coating is dissolved in said mastic, and cooling said means.

3. A process for providing a protective coating to the external surface of a joint between two metallic pipes and the external surfaces of the pipes immediately surrounding said joint comprising positioning a tubular covering means adjacent to said pipes in such a manner that said covering means is generally coaxial with relation to said pipes, said covering means comprising a tube of irradiated polyolefin having the property of elastic memory and capable of contracting radially inwardly toward said pipes upon the application of heat at its recovery temperature, the internal surface of said polyolefin to be provided with a mastic coating and antitack coating covering said mastic, said antitack coating comprising a wax which goes into solution in said mastic under the temperature at which said polyolefin tube undergoes recovery, subjecting said means to heat at the recovery temperature of said polyolefin tube whereby said polyolefin tube is caused to contract radially inwardly so as to urge said mastic toward and into contact with said joint and said pipes and whereby said antitack coating is dissolved in said mastic, and allowing said means to cool.

4. The process of the claim 3 wherein said polyolefin is polyethylene.

5. The process of claim 3 wherein said elastic memory material is a copolymer of ethylene and an alkyl acrylate.

6. The process of claim 1 wherein said substrate is preheated before said positioning step.

7. The method of claim 2 wherein said antitack coatings covers the entire exposed surface of said mastic prior to said change in dimension.

References Cited

UNITED STATES PATENTS

| | | | |
|---|---|---|---|
| 2,159,993 | 5/1939 | Krueger | 156—321 |
| 2,993,820 | 7/1961 | Marshall | 156—86 X |
| 3,050,786 | 8/1962 | St. John et al. | 156—84 X |
| 3,163,182 | 12/1964 | Sandow et al. | 156—86 X |
| 3,429,954 | 2/1969 | Atkins et al. | 156—86 X |

CARL D. QUARFORTH, Primary Examiner

S. HELLMAN, Assistant Examiner

U.S. Cl. X.R.

156—84